Patented Oct. 16, 1951

2,571,242

UNITED STATES PATENT OFFICE 2,571,242

OPAL GLASS AND METHOD OF CONTROLLING FIRE THEREOF

Harrison P. Hood, Corning, N. Y., assignor to Corning Glass Works, Corning, N. Y., a corporation of New York No Drawing. Application July 21, 1948, Serial No. 40,015

2 Claims. (Cl. 106—52)

This invention relates to opal glasses which are useful for the production of such articles as shades, globes, shields, bulbs, and other light diffusing devices. Specifically, it relates to opal glasses from which the tendency to exhibit fire has been eliminated and to means for effecting this change.

The term "opal glass," as used herein, denotes any glass which contains, dispersed therein, a medium or phase which renders the glass light diffusing. Opal glasses are well known in the glass-making art. Among the more important opalizing agents employed are fluorides, sulphates, chlorides and phosphates. Many opal glasses, particularly those that depend on fluorides for an opalizing phase, tend to exhibit fire, that is, they impart a reddish or fiery color to transmitted light. Opal glasses having this characteristic have come to be known as fire opals.

Fluoride opal glasses possess many features that make them more desirable than other types of opal glasses, particularly for illuminating purposes. They permit a wide variation in opal density, that is, the percentage of total visible light transmission. This is important since a direct lighting system requires a glass having a high transmission while an indirect system may require a glass having a lower transmission.

The fiery appearance is highly undesirable in most cases, especially in illuminating glassware, and much time and effort have been spent in efforts to diminish or avoid it. It is generally thought that it results from selective scattering of the transmitted light by the opalizing medium and is related to the particle size of that medium. It has been suggested, therefore, that the fire might be reduced by producing thicker ware thereby lengthening the light path, or by employing special manufacturing techniques, such as controlled cooling rates, to alter the opal phase formation. While some of these suggested techniques are successful in diminishing fire, they are not always practical due to the increased cost involved and also to the fact that it is virtually impossible to attain certain desirable degrees of opacity, or opal density, free from fire.

The desirable solution to this long persisting problem is a means of eliminating the fiery appearance from fire opal glasses without appreciably disturbing the other properties and characteristics of the glasses and it is the primary object of my invention to provide such a solution.

Another object is to provide fire-free opal glasses.

A further object is to modify fire opal glass compositions so as to eliminate the fire.

To these and other ends my invention comprises including 0.01% to 0.1% CuO in certain conventional fire opal glasses, the amount included being sufficient to eliminate the fire from such glasses but insufficient to produce appreciable coloration therein. The invention further includes the glass compositions so produced.

I have discovered that copper oxide is effective in eliminating fire without causing appreciable coloration when used in an alkaline silicate opal glass. Acidic constituents such as $B_2O_3$ and $P_2O_5$ should not be used in amounts greater than about 8%.

The alkali metal oxides $K_2O$, $Na_2O$, or $Li_2O$, may be used individually or in combination as desired. It is advantageous to have at least one of them present in substantial amount, since they are strongly alkaline.

The alkaline earth metal oxides, may be used as desired. They increase the alkalinity of the glasses, although not as strongly as the alkali metal oxides.

$Al_2O_3$ and PbO are other oxides commonly used in silicate opals and may be present in the glasses of the present invention as desired. The presence of $Al_2O_3$ in fluoride opals is particularly advantageous, as is well known.

The presence of reducing agents, such as carbonaceous materials or sulfides, affects CuO adversely and is to be avoided. The glass is preferably kept in an oxidized state, during melting, through the use of oxidizing agents, such as nitrates, in the batch.

Within the previous limitation, I have found that CuO is effective in eliminating fire from silicate opal glasses regardless of the opalizing medium. The principal benefit is derived in fluoride opals, however, because of their general desirability for illuminating purposes and their greater tendency to produce a fiery type of opal.

The following batch and corresponding glass composition serve to illustrate but not to limit my invention:

| | | | Per cent |
|---|---|---|---|
| Sand | 300 | $SiO_2$ | 63 |
| $Na_2CO_3$ | 102 | $Na_2O$ | 14 |
| $NaNO_3$ | 14 | $Al_2O_3$ | 12 |
| $Al(OH)_3$ | 90 | CaO | 11 |
| $CaF_2$ | 75 | CuO | 0.04 |
| CuO | 0.2 | F | 8 |

The above composition exclusive of fluorine totals approximately 100%. For convenience and clarity the composition is shown as oxides except for fluorine, the content of which is given separately.

The amount of CuO shown above is effective when the glass is crucible melted in a gas-fired muffle at 1350° C. When the glass is melted in a closed container where there is less opportunity for the fluorine to escape, a somewhat larger quantity of CuO is required to produce the same result. Likewise if the glass composition is changed the amount of CuO necessary to eliminate fire will be changed. Other factors which influence fire are melting temperatures and times, rate of cooling and ware thickness. The exact amount of CuO within the limits 0.01% to 0.1 required to eliminate fire without producing a visible coloration of the glass may readily be determined by trial.

The term, "oxidized alkaline silicate fluoride opal glass," as used in the claims, means an alkaline glass, prepared by fusion of raw glass-making materials under oxidizing conditions, preferably in the presence of an oxidizing agent such as $NaNO_3$, containing, on the oxide basis, a major proportion of silica, a minor proportion of an alkali metal oxide such as $Li_2O$, $Na_2O$, or $K_2O$, and a minor proportion of a fluoride opalizing medium, preferably containing a minor proportion of an alkaline earth metal oxide such as CaO, and optionally containing a minor proportion of one or more other conventional glass-forming oxides such as $Al_2O_3$, PbO, $B_2O_3$, or $P_2O_5$ but not over 8% $B_2O_3$ and $P_2O_5$ combined.

I claim:

1. An otherwise normally firey, oxidized alkaline silicate fluoride opal glass containing 0.01% to 0.1% CuO, whereby the firey appearance is eliminated.

2. The method of preventing the firey appearance in a normally firey, oxidized alkaline silicate fluoride opal glass, which comprises introducing 0.01% to 0.1% CuO into the glass.

HARRISON P. HOOD.

REFERENCES CITED

The following references are of record in the file of this patent:

UNITED STATES PATENTS

| Number | Name | Date |
|---|---|---|
| 1,305,793 | Gage et al. | June 3, 1919 |
| 2,097,275 | Fischer | Oct. 26, 1937 |
| 2,097,602 | Fischer | Nov. 16, 1937 |
| 2,440,048 | Hood | Apr. 20, 1948 |